(12) United States Patent
Pfleiderer et al.

(10) Patent No.: US 8,132,484 B2
(45) Date of Patent: Mar. 13, 2012

(54) SPROCKET COVER ARRANGEMENT FOR A HAND-HELD CHAIN SAW

(75) Inventors: Gerhard Pfleiderer, Winnenden (DE);
Maximilian Eberhardt, Esslingen (DE);
Günter Wolf, Oppenweiler (DE);
Jürgen Bernert, Remshalden (DE)

(73) Assignee: Andreas Stihl AG & Co. KG,
Waiblingen (DE)

( * ) Notice: Subject to any disclaimer, the term of this patent is extended or adjusted under 35 U.S.C. 154(b) by 1211 days.

(21) Appl. No.: 11/836,161

(22) Filed: Aug. 9, 2007

(65) Prior Publication Data

US 2008/0034597 A1      Feb. 14, 2008

(30) Foreign Application Priority Data

Aug. 10, 2006   (DE) .......................... 10 2006 037 329

(51) Int. Cl.
*F16H 57/02*   (2006.01)
*B27B 17/02*   (2006.01)
*B27B 17/00*   (2006.01)
*F16B 43/00*   (2006.01)

(52) U.S. Cl. .......... 74/606 R; 30/386; 30/383; 411/533; 411/999; 411/386; 411/427

(58) Field of Classification Search ............... 30/386, 30/383; 411/10, 113, 386, 427, 533, 999; 470/18; 280/728.2; 74/606 R See application file for complete search history.

(56) References Cited

U.S. PATENT DOCUMENTS

| 2,078,411 | A  | * | 4/1937 | Richardson ............. 411/113 |
| 5,353,506 | A  | * | 10/1994 | Muller et al. ............. 30/386 |
| 6,095,733 | A  | * | 8/2000 | Busby et al. .............. 411/10 |
| 6,170,858 | B1 | * | 1/2001 | Berger ................. 280/728.2 |
| 6,256,890 | B1 | * | 7/2001 | Schliemann et al. ....... 30/386 |
| 7,250,003 | B2 | * | 7/2007 | Thompson ................. 470/18 |
| 7,743,513 | B1 | * | 6/2010 | Fisher et al. ............. 30/386 |
| 2011/0232110 | A1 | * | 9/2011 | Wolf et al. ............... 30/383 |

* cited by examiner

*Primary Examiner* — Vinh T. Luong
(74) *Attorney, Agent, or Firm* — Gudrun E. Huckett

(57) ABSTRACT

A sprocket cover arrangement for a hand-held chain saw has a housing and a sprocket cover that has an opening and is connected to the housing. At least one stud bolt having a first end secured to the housing and having a second end that is a free threaded end is provided. The free threaded end projects through the opening of the sprocket cover to an exterior side of the sprocket cover when the sprocket cover is positioned in an operating position on the housing. A nut is screwed onto the free threaded end of the at least one stud bolt on the exterior side of the sprocket cover so as to secure the sprocket cover on the housing. The nut is secured captively, rotatably and with play in the opening of the sprocket cover.

10 Claims, 8 Drawing Sheets

SPROCKET COVER ARRANGEMENT FOR A HAND-HELD CHAIN SAW

BACKGROUND OF THE INVENTION

The invention relates to a sprocket cover arrangement for a hand-held chain saw comprising a sprocket cover, a housing, at least one stud bolt attached to the housing for screw-connecting the sprocket cover to the housing, and a nut to be screwed onto a free threaded end of the stud bolt that passes in the mounted state of the sprocket cover through an opening of the sprocket cover.

Hand-held chain saws have a saw chain that circulates externally on a guide bar. For driving the saw chain, a sprocket with external teeth is provided and is driven by a drive motor. The external teeth of the sprocket engage the space between the members of the saw chain and drive the saw chain.

The drive shaft of the sprocket is supported in a housing of the chain saw. A sprocket cover is screwed to the housing and covers the area in which the sprocket is arranged. At least one stud bolt is attached to the housing for realizing the screw connection; in the mounted state of the sprocket cover, the stud bolt projects through an opening of the sprocket cover. A nut is screwed onto a free threaded end of this stud bolt and presses the sprocket cover against the housing.

The guide bar of the saw chain is threaded onto the at least one stud bolt and secured by being clamping between the housing and the sprocket cover. The sprocket cover, in addition to its protective function, also has a securing function for the guide bar. For maintenance work on the guide bar or for changing the guide bar, the sprocket cover is removed and the guide bar can be taken off or exchanged. During assembly, first the guide bar is threaded onto the at least one stud bolt and, subsequently, the sprocket cover is positioned in such a way that the at least one stud bolt projects through the opening of the sprocket cover. At the end of assembly, the nut is threaded onto the free threaded end of the stud bolt and tightened.

Assembling the arrangement is particularly difficult for the user at the location of use of the chain saw. The guide bar and sprocket cover must be held simultaneously in the mounting position while the nut must be screwed onto the stud bolt. The nut can drop to the ground and can be lost. In particular, in the case of an arrangement with two stud bolts, the weight of the not yet finally fixed guide bar can lead to canting of the screw connection.

SUMMARY OF THE INVENTION

It is an object of the present invention to further develop a sprocket cover of the aforementioned kind in such a way that the process of attaching the sprocket cover is simplified.

In accordance with the present invention, this is achieved in that the nut is secured captively, rotatably and with play in the opening of the sprocket cover.

Accordingly, a sprocket cover arrangement is proposed in which the nut is secured in a captive way but rotatably and with play in the opening of the sprocket cover. Advantageously, relative to the longitudinal axis of the stud bolt the play is an axial play, a radial play and/or a tilting play. In particular, the axial play is at least as large as a predetermined screw-in depth of the stud bolt into the nut.

Advantageously, the length of the stud bolt and the play of the nut in the sprocket cover are matched relative to one another such that, when the sprocket cover is positioned in the operating position, the screw connection of the nut and the stud bolt can be completely released and can be completely tightened.

In this way, the sprocket cover can be pushed onto the at least one stud bolt to such an extent that the guide bar of the saw chain is provisionally fixed. When threading the sprocket cover onto the stud bolt, the nut will yield because of its play to such an extent that threading of the sprocket cover onto the stud bolt is not hindered by the nut affixed to the sprocket cover. Only after the cover has been completely threaded onto the bolt, thus causing a provisional fixation of the guide bar, the nut is tightened without having to pay special attention to the positional fixation of the guide bar and of the sprocket cover. In reverse, when removing the parts, the nut can be completely unscrewed from the threaded end of the stud bolt without requiring a positional change of the sprocket cover. Until the screw connection is completely released, the arrangement remains in position.

In an advantageous further embodiment, the nut has an inner threaded section that is adjoined at the end facing the stud bolt by a smooth sleeve section. The length of the stud bolt and the length of the smooth sleeve section are expediently matched relative to one another such that the stud bolt engages the smooth sleeve section when the sprocket cover is positioned in the operating position and when the nut is completely pulled out relative to the exterior side of the sprocket cover.

When positioning the sprocket cover, the stud bolt moves into the sleeve section so that a relative positional alignment of the nut provided with play and of the stud bolt is achieved. Inasmuch as the free threaded end of the stud bolt hits the inner threaded section of the nut, it forces the nut to the exterior side of the sprocket cover. The length adjustment effected in the aforementioned way has the effect that the stud bolt during the threading process and in particular upon reaching the predetermined mounting position cannot slip out of the leading sleeve section providing a guiding function. The threading process can be further improved by a centering cone at the end of the nut facing the stud bolt. As a whole, simply by pushing the sprocket cover into position, a precise and reliable relative positioning of all individual parts relative to one another is realized.

In a preferred embodiment, the opening in the sprocket cover has a radial inwardly oriented holding edge that is engaged by a radial outwardly oriented nose of the nut in a positive-locking way. The nut has expediently an actuating section that is embodied especially as a hexagon section and that is adjoined by a tubular shaft inserted with play into the opening of the sprocket cover. With an appropriate length adjustment, the tubular shaft allows free rotation as well as play of the nut in the opening in all required spatial degrees of freedom. The interaction of the securing edge and of the nose generates a safe positive-fit connection without this impairing the rotational movement and play of the nut.

The nut is preferably embodied as a shoulder nut. By eliminating a washer that can be lost, the shoulder of the shoulder nut generates only a minimal surface pressure at the sprocket cover.

In particular in an embodiment comprising two stud bolts, the inventive arrangement is suitable for compensating positional tolerances, canting or the like. One of the two nuts can be tightened provisionally while the second nut is secured captively relative to the correlated stud bolt in its position without however impairing the process of screwing at the first stud bolt.

DESCRIPTION OF THE PREFERRED EMBODIMENTS

Figure 1:
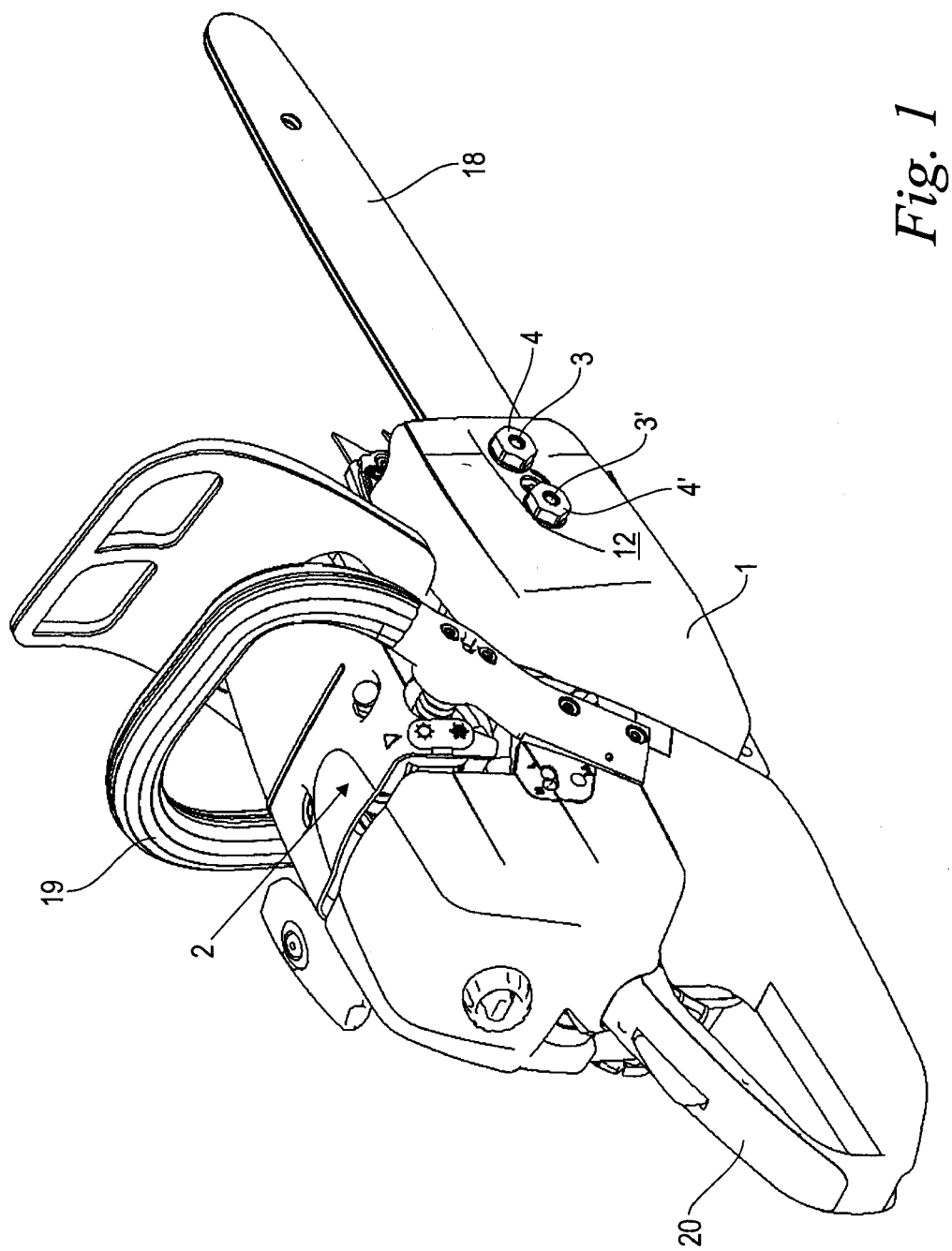
FIG. 1 is a perspective view of a chain saw with sprocket cover arrangement in accordance with the present invention in which the sprocket cover is attached to the housing of the chain saw by means of two stud bolts.

A hand-held motor-driven chain saw with the sprocket cover arrangement in accordance with the invention is illustrated in FIG. 1. The chain saw comprises a housing 2 in which an internal combustion engine, not illustrated, is arranged. A guide bar 18 is arranged laterally on the housing 2 and, relative to the usual operating position, projects forwardly past the housing 2. A saw chain, not illustrated, is driven by the internal combustion engine so as to circulate in a guided fashion about the outer edge of the guide bar 18. Centrally above the housing 2 a front-end handle 19 is arranged. On the back of the housing 2, opposite the guide bar 18, a rear handle 20 is provided. By means of the two handles 19 and 20 the chain saw is carried and manually guided in operation.

The internal combustion engine drives a sprocket, not illustrated, whose external teeth engage the space between the members of the saw chain and drive the saw chain. The sprocket and a section of the guide bar 18 adjoining the sprocket are covered by the sprocket cover 1. Two stud bolts 3, 3' are attached to the housing 2 and two nuts 4, 4' are screwed onto the stud bolts 3, 3' from the exterior side 12 of the sprocket cover 1. The nuts 4, 4' force the sprocket cover 1 against the housing 2 and the guide bar 18 is clamped between the sprocket cover 1 and the housing 2.

Figure 2:
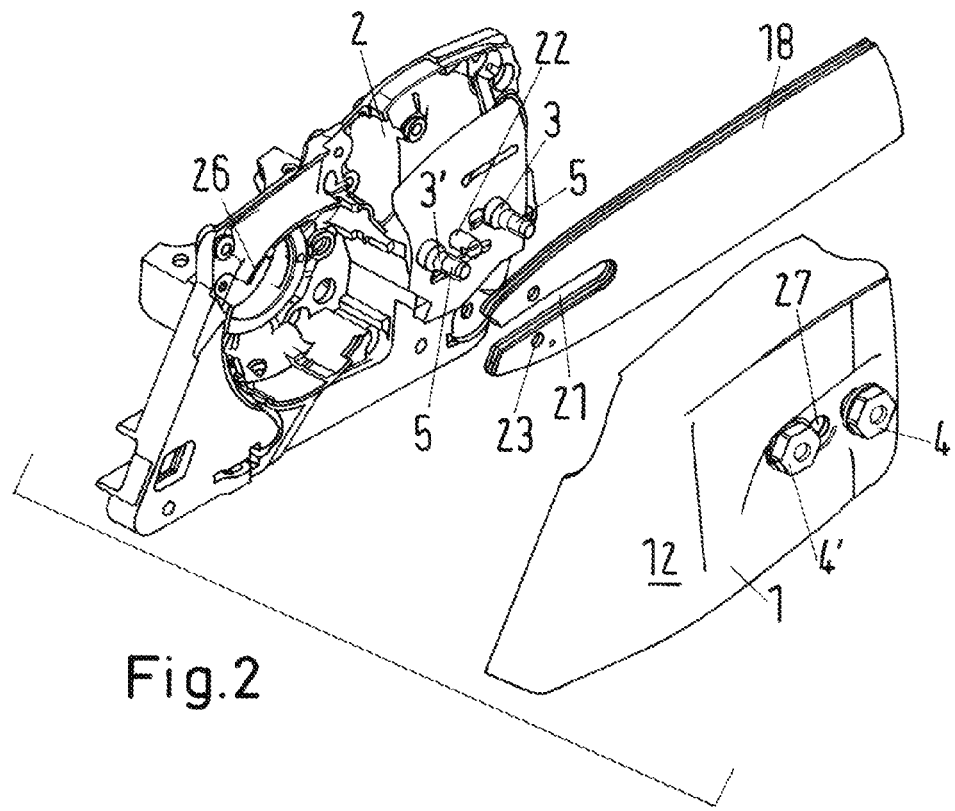
FIG. 2 shows in an exploded view the arrangement according to FIG. 1 in the area of the sprocket cover with details of the arrangement of the stud bolts and the guide bar.

FIG. 2 shows an exploded illustration of the arrangement according to FIG. 1 in the area of the sprocket cover 1. The housing 2 has a bearing opening 26 through which, in the mounted state, a drive shaft, not illustrated, passes with a sprocket, also not illustrated. Viewed from the bearing opening 26 in the direction of the guide bar 18, there are two stud bolts 3, 3' attached to the housing 2. At their end facing the exterior side 12 of the sprocket cover 1, the two stud bolts 3, 3' have a free threaded end 5, respectively. Between the two stud bolts 3, 3' an adjusting screw 22 for the chain tensioner 24, illustrated in FIG. 3, is provided.

The guide bar 18 has at its end facing the bearing opening 26 a slot 21 that extends in the direction of the longitudinal axis of the guide bar 18. In the mounted state, the two stud bolts 3, 3' penetrate the slot 21 and enable a longitudinal displacement of the guide bar 18. Above and below the slot 21, the guide bar 18 is provided with a bore 23, respectively. In the mounted state, a pin 25 (illustrated in FIG. 3) of the chain tensioner 24 engages the lower bore 23. When the sprocket cover 1 is released, the guide bar 18 can be moved in the direction of the longitudinal axis of the guide bar 18 by actuating the chain tensioner 24 by means of the adjusting screw 22 until the desired tension of the saw chain, not illustrated, is adjusted.

In the mounted operation-ready state the two stud bolts 3, 3' pass through the sidewall of the sprocket cover 1 to its exterior side 12. The two nuts 4, 4''' are screwed onto the threaded end 5 of the two stud bolts 3, 3', respectively. After partial release of the nuts 4, 4', the adjusting screw 22 can be actuated through an adjusting opening 27 in the sprocket cover 1 and the chain tension can be corrected in this way. After complete release of the nuts 4, 4', the sprocket cover 1 can be removed from the housing 2; this enables demounting or exchange of the guide bar 18.

Figure 3:
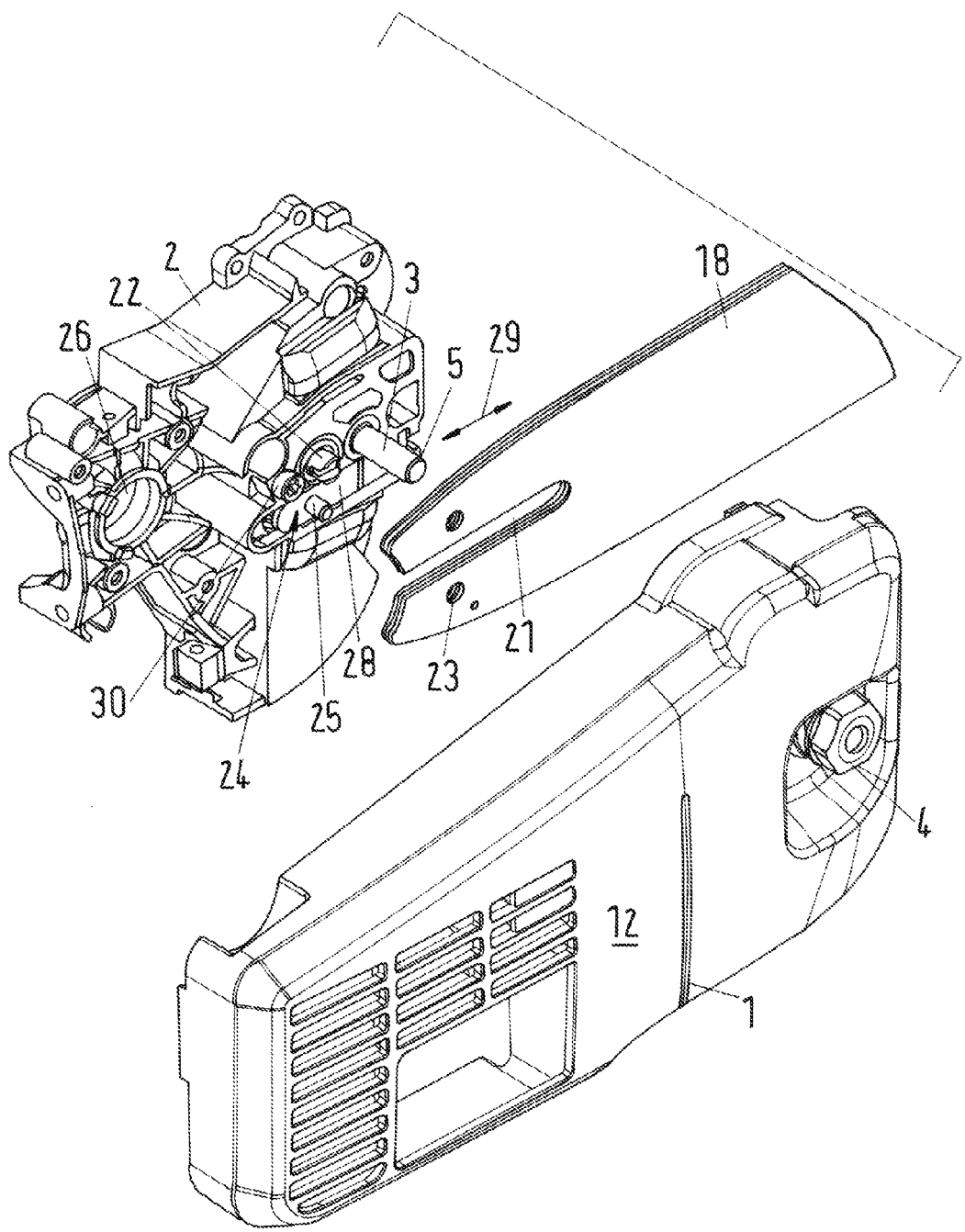
FIG. 3 is a variant of the arrangement according to FIG. 2 with only one stud bolt.

In FIG. 3, a variant of the arrangement according to FIG. 2 is illustrated in which only one stud bolt 3 is arranged in front of the adjusting screw 22. In place of the rear stud bolt 3 (FIG. 2), a screw head 30 is provided that together with the stud bolt 3 engages the slot 21 of the guide bar 18 in the mounted state. Accordingly, there is only one nut 4 provided on the sprocket cover 1. In regard to other features and reference numerals, the arrangement according to FIG. 3 is identical to that of FIG. 2.

The chain tensioner 24 comprises in addition to the adjusting screw 22 an adjusting element 28 to which the pin 25 is attached. The adjusting element 28 is movable by means of adjusting screw 22 and a worm drive, not illustrated, in the direction of the double arrow 29 parallel to the longitudinal axis of the guide bar 18. The pin 25 engaging the bore 21 moves the guide bar 18 by the same amount in the direction of double arrow 29 so that the tension of the saw chain, not illustrated, can be adjusted. The same holds true also for the chain tensioner not illustrated in detail in FIG. 2.

Figure 4:
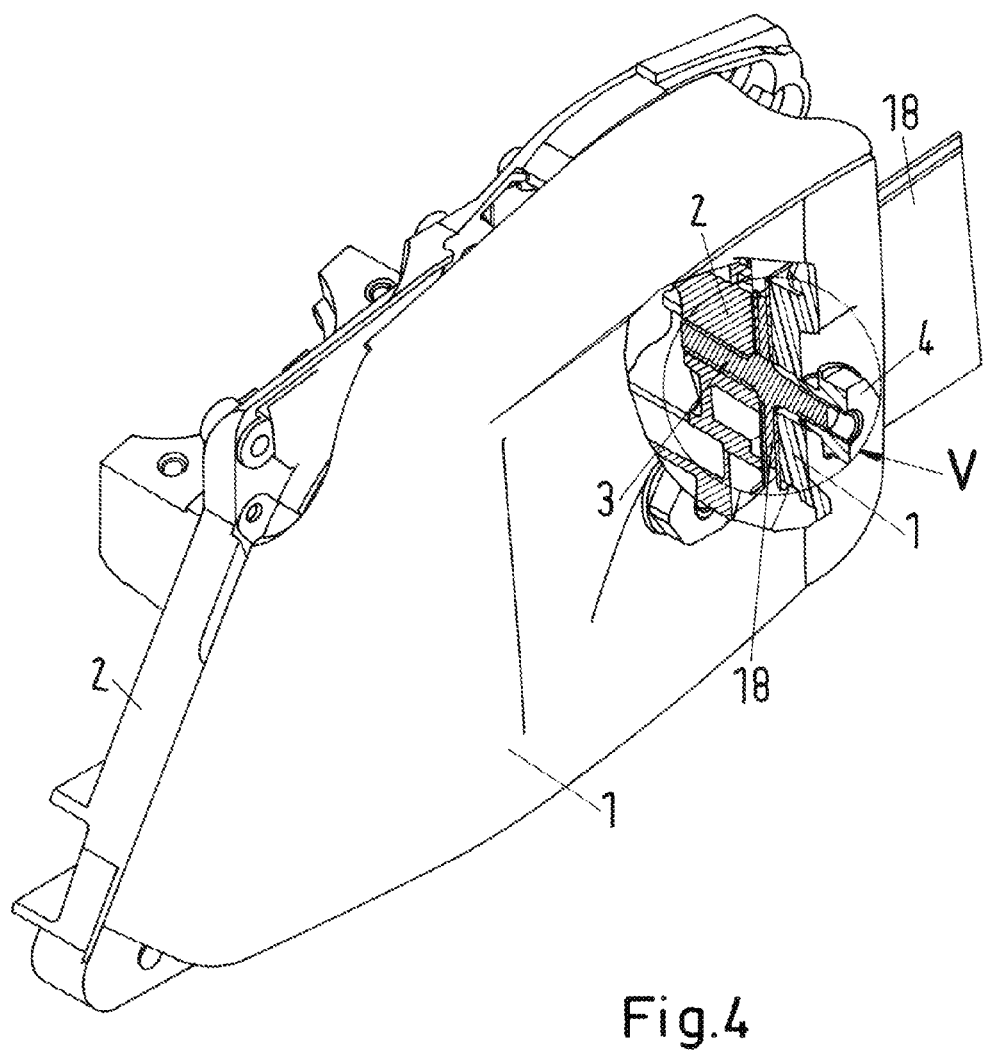
FIG. 4 is a partially sectioned view of the arrangement according to FIG. 2 in the mounted state.

In FIG. 4, a partially sectioned illustration of the arrangement according to FIG. 2 is shown in the mounted state. It can be seen that the sprocket cover 1 rests flat against the housing 2. The guide bar 18 is clamped flat between the housing 2 and a contact surface of the sprocket cover 1. An actuation of the chain tensioner 24 (FIG. 3) is not possible in this state. The selected tension of the saw chain is fixed. The stud bolt 3 attached to the housing 2 penetrates the guide bar 18 and the sprocket cover 1. The nut 4 is placed externally onto the stud bolt and is shown in a state in which it is not yet tensioned. The configuration of the additional stud bolt 3' illustrated in FIG. 2 with the correlated nut 4' is identical to that of the illustration of FIG. 4.

Figure 5:
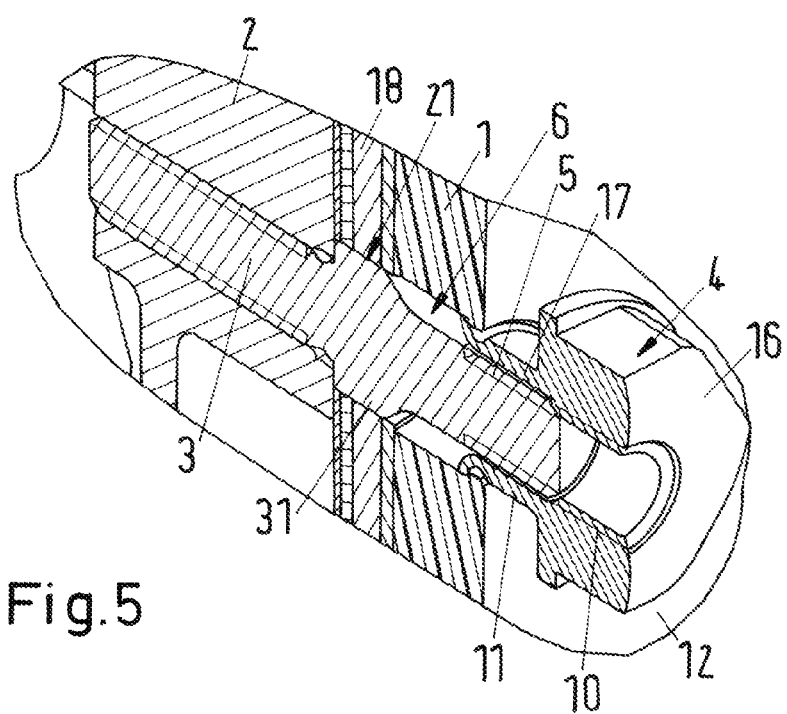
FIG. 5 is a detailed section view of the detail V of FIG. 4 with details of the screw connection between the stud bolt and the nut.

The detail V identified in FIG. 4 is illustrated enlarged in FIG. 5. It can be seen that the stud bolt 3 is threaded into the housing 2. The screw connection is such that the stud bolt 3 under operating conditions is attached fixedly to the housing 2 so that it cannot rotate. The stud bolt 3 has external to the housing 2 a collar or shoulder 31 with a larger diameter that engages without play the slot 21 of the guide bar 18. The guide bar 18 is fixed in this way with positive fit in the vertical direction.

The housing 1 has a circular opening 6 and the stud bolt 3 passes through this opening 6. In the area of the opening 6, the diameter of the stud bolt 3 is reduced relative to the collar 31 and the opening 6 so that in the mounted state a free annular space remains within the opening 6. The nut 4 is provided in the direction of the exterior side 12 with an actuating section 16 that is embodied in the illustrated configuration as a hexagon section. The nut 4 can be rotated by means of the actuating section 16, for example, by using a wrench. Instead of the configuration as a hexagon section, it is also possible to provide knurling or the like for manual actuation of the nut 4. The actuating section 16 is adjoined by a monolithic tubular shaft 17 in the direction toward the housing 2 and the shaft 17 is inserted with play into the opening 6 of the sprocket cover 1. At the free end of the tubular shaft 17, the nut 4 is secured captively, rotatably and with play in the opening 6 of the sprocket cover 1 in a way to be described in the following.

The nut 4 is provided centrally and coaxially to the stud bolt 3 with a bore that is embodied at the end facing the stud bolt 3 as a smooth sleeve section 11 and at the opposite end as an inner thread section 10. In the illustrated state of the nut 4, in which the nut is not yet tightened, the threaded end 5 of the stud bolt 3 engages loosely the smooth (no thread, no surface structure) sleeve section 11 without being screwed onto the thread section 10.

Figure 6:
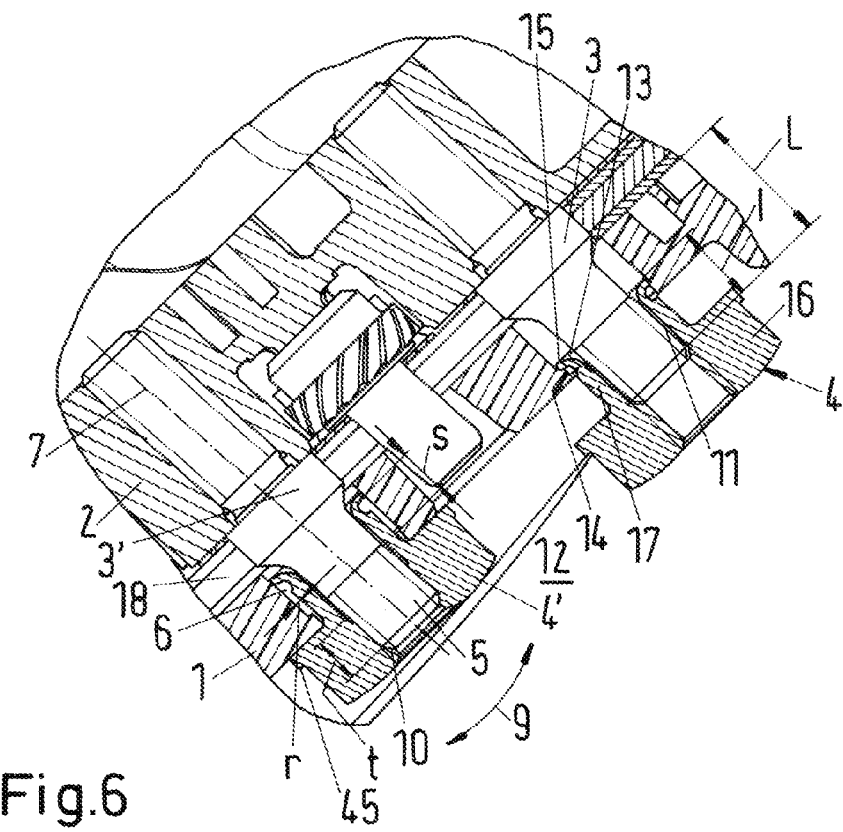
FIG. 6 is a longitudinal section illustration of the arrangement according to FIG. 4 with a tightened nut and a released nut, respectively.

FIG. 6 shows a longitudinal section illustration of the arrangement according to FIG. 4 in the area of the two stud bolts 3, 3'. The leading nut 4 is shown in accordance with the illustration of FIG. 5 in the not yet tightened state. The further rearward nut 4' is fixedly screwed with its inner thread section 10 onto the threaded end 5 of the corresponding stud bolt 3' such that it forces the sprocket cover 1 with interposition of the guide bar 18 tightly against the housing 2. For this purpose, the nuts 4, 4' are shoulder nuts each having a circumferentially extending shoulder 45 facing the sprocket cover 1; in the tightened state of the nuts 4, 4', the shoulder 45 is pressed flat against the exterior surface of the sprocket cover 1, respectively.

Both identically configured nuts 4, 4' engage with their cylindrical tubular shaft 17 with play the correlated openings 6. The free end of the tubular shaft 17 facing the housing 2 is provided with a circumferentially extending, radial outwardly oriented nose 15. On the end facing the exterior side 12, a radial inwardly oriented securing edge 14 extends circumferentially in the opening 6 and is positive-lockingly engaged by the circumferentially extending nose of the nuts 4. In this way, the nut 4 is positive-lockingly secured against loss in the sprocket cover 1.

In the illustrated embodiment, the sprocket cover 1 is made from cast light metal, in this case magnesium, wherein the securing edge 14 is unitarily formed on the sprocket cover 1 during casting together with the other sections of the sprocket cover 1. The nut 4 is configured as a monolithic part from metal, in particular, steel, wherein in the blank state, not illustrated, it does not yet have the circumferentially extending nose 15. For mounting, the tubular shaft 17 is inserted into the opening 6 until the free end of the tubular shaft 17 rests inside the circumferential securing edge 14. Subsequently, the free end of the tubular shaft 17 is tapped into place in such a way that by material deformation the crimped, circumferentially extending nose 15 is formed. In this state, the nut 4 is captively secured on the sprocket cover 1.

Between the exterior side of the tubular shaft 17 and the opening 6, radial play r remains that enables free rotation of the nut 4 relative to the sprocket cover 1. Moreover, a positional adjustment of the nut 4 relative to the correlated stud bolt 3 in the radial direction relative to a longitudinal axis 7 of the stud bolt 3 is possible. Based on the length of the tubular shaft 17 between the actuating section 16 and the circumferentially extending nose 15 there is moreover axial plays relative to the longitudinal axis 7 of the stud bolt 3. The combination of axial play s and radial play r leads also to a tilting play of the nut 4 relative to the sprocket cover 1 as indicated by double arrow 9.

The length L of the stud bolt 3 projecting in the mounted state past the guide bar 18, the positioning of the securing edge 14 and of the nose 15, and the play of the nut 4 in the sprocket cover 1 are matched to one another in such a way that when sprocket cover 1 is positioned in the mounted position or operating position in accordance with the illustration of FIG. 6 the screw connection of the nut 4 and the stud bolt 3 can be completely released and can be completed tightened. For illustration purposes, the leading nut 4 is shown in the completely released state and the rear nut 4' is shown in the completely tightened state.

In the completely tightened state of the nut 4', its inner thread section 10 is screwed by screw-in depth t onto the threaded end 5 of the correlated stud bolt 3'. The axial play s of the nut 4' is at least as large as the screw-in depth t. This contributes to the possibility of tightening or completely releasing the nut 4' without positional change of the guide bar 18 and the sprocket cover 1 relative to the illustrated operating position.

Moreover, the length L of the stud bolt 3 and the length l of the smooth sleeve section 11 are matched relative to one another in such a way that the stud bolt 3 engages the smooth sleeve section 11 when the sprocket cover 1 is positioned in the operating position and when the nut 4 is pulled out completely to the exterior side 12 of the sprocket cover 1. During mounting of the sprocket cover 1, the two threaded ends 5 of the stud bolts 3, 3' are threaded into the corresponding sleeve section 11 of the correlated nut 4, 4', respectively. As a threading aid, the two nuts 4, 4' have on their side facing the correlated stud bolt 3, 3' a centering cone 13 for the stud bolts 3, 3'. During threading and during pushing the sprocket cover 1 further into position, the nuts 4, 4' can be displaced toward the exterior side 12 by utilizing the axial play s without the threaded end 5 slipping out of the sleeve section 11.

When the sprocket cover 1 is positioned in the operating position, the two nuts 4, 4' in accordance with the illustration of the nut 4 are aligned relative to the correlated stud bolt 3, 3' in a position ready for tightening, even without the inner thread section 10 engaging the correlated threaded end 5. This automatic positional alignment of the nuts 4, 4' relative to the correlated stud bolts 3, 3' is realized also when the sprocket cover 1 is in a slanted or canted position because the nuts 4, 4', as a result of their axial play s, their radial play r, and their tilting play 9, adjust automatically to the position of the correlated stud bolts 3, 3' during insertion into the respective sleeve section 11.

For mounting it, the guide bar 18 is placed onto the at least one stud bolt 5. Subsequently, the sprocket cover 1 is positioned wherein the at least one nut 4 automatically aligns itself relative to the correlated stud bolt 3. By pressing down the sprocket cover 1, the guide bar 18 is provisionally fixed in its position. In the embodiment with only one stud bolt 3 and one nut 4, it is only necessary to subsequently tighten the aligned and captively secured nut 4. In an embodiment with two stud bolts 3, 3' and two nuts 4, 4', the tightening of the two nuts 4, 4' can be done independent from one another; the nut 4, 4' that is currently not handled is captively secured in position.

Figure 7:
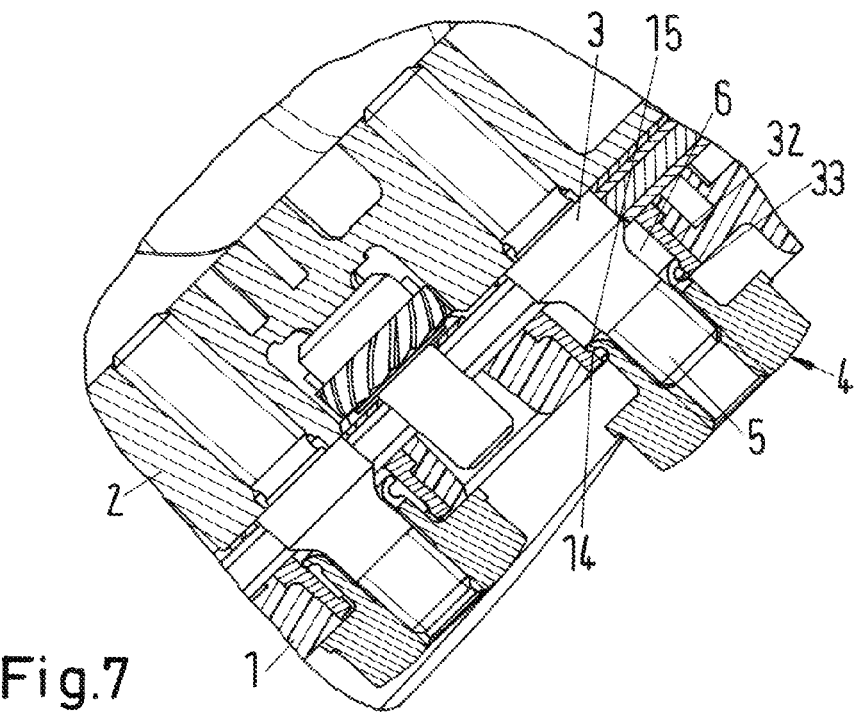
FIG. 7 is a variant of the arrangement according to FIG. 6 with a sleeve inserted into the plastic sprocket cover for providing a captive securing action of the nut with play.

In FIG. 7, a variant of the arrangement of FIG. 6 is shown. The sprocket cover 1 is manufactured as an injection-molded plastic part. For forming the opening 6, sleeves 32 of metal, in particular made from steel or aluminum, are inserted into the plastic material of the sprocket cover 1; these sleeves 32 each have an integrally formed securing edge 14. In the area of the nose 15 of the monolithic nut 4 slots 33 are provided; they facilitate the tapping action or crimping process for forming the noses 15.

Figure 8:
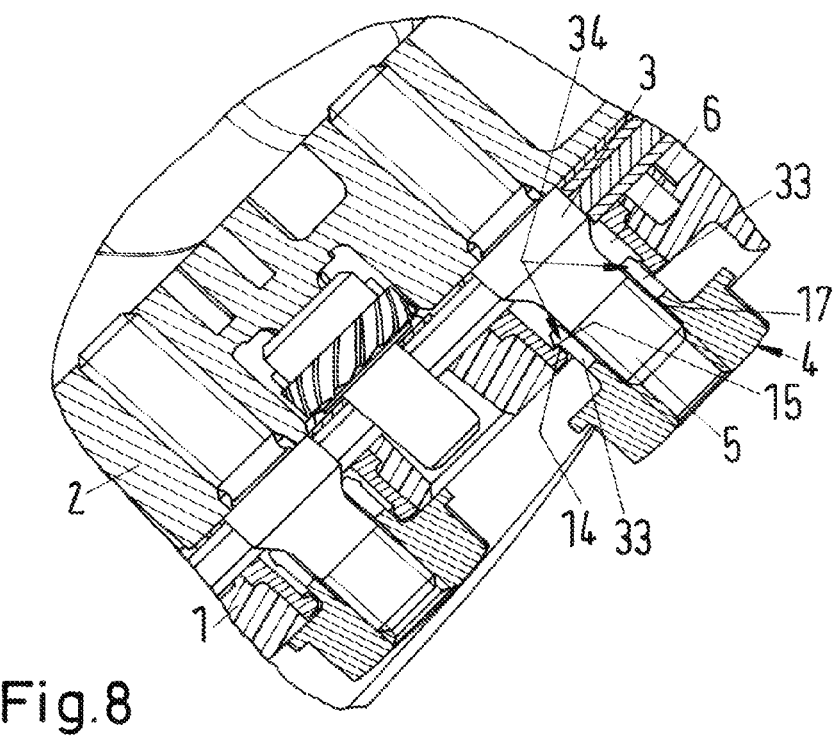
FIG. 8 shows an embodiment of the invention with locking tongues on the nut for securing the nut.

In the embodiment according to FIG. 8, the tubular shaft 17 is provided with several slots 33 so that elastic springy locking tongues 34 with integrally formed noses 15 will result. For mounting, it is not necessary to perform a deformation step. Instead, the nut 4 is inserted into the opening 3 by utilizing the elastic spring travel of the locking tongues 34 and the noses 15 of the locking tongues 34 snap into place behind the securing edge 14 and effect a positive-locking positional securing of the nut 4.

Figure 9:
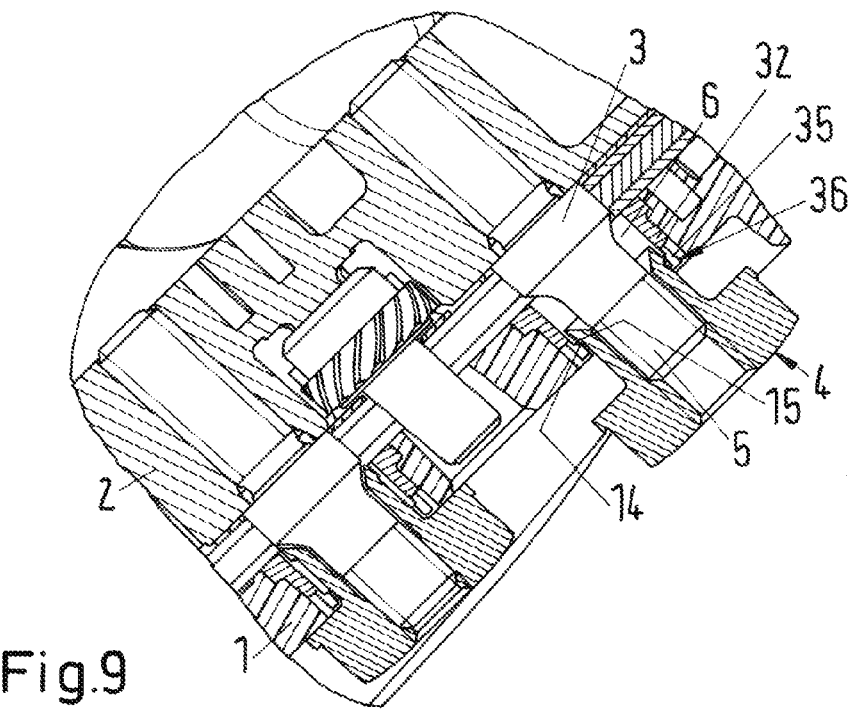
FIG. 9 is a variant of the arrangement according to FIG. 8 with locking tongues on the sleeve inserted into the sprocket cover.

Alternatively, in accordance with the embodiment according to FIG. 9, it may be expedient to provide locking tongues 36 with slots 35 on the sleeve 32 inserted into the sprocket cover 1 manufactured from plastic material.

Figure 10:
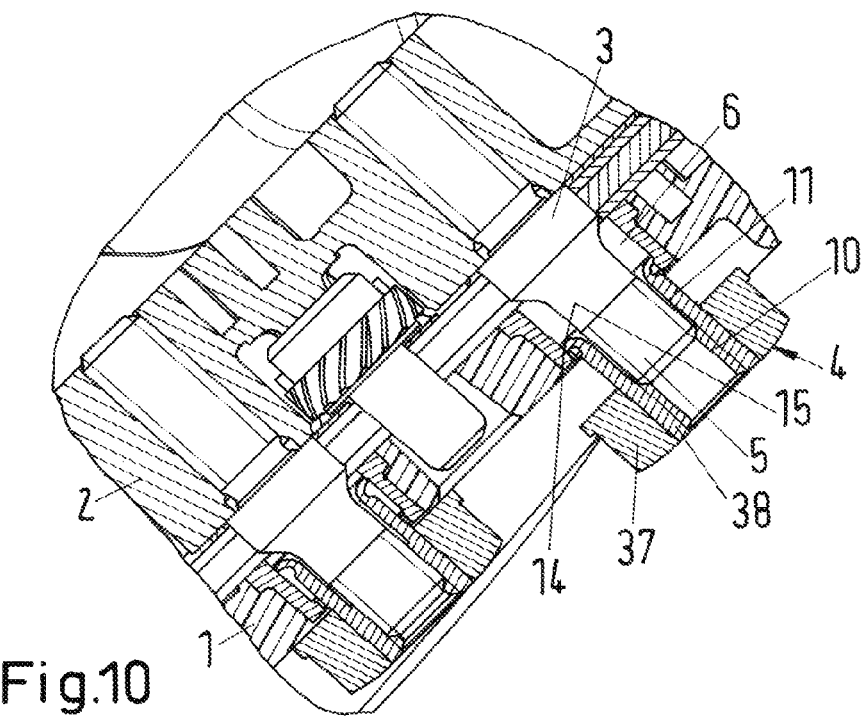
FIG. 10 is an embodiment with two-part nut and crimped inner sleeve.

In the embodiment according to FIG. 10, the nut 4 is of a two-part configuration. An inner sleeve 38 of metal provided with the sleeve section 11 and the inner thread section 10 is pushed from the interior side through the opening 3 of the sprocket cover 1 to the exterior side 12 and is connected on the exterior side 12 to a gripping section 37 for forming the nut 4. The gripping section 37 can also be formed of metal and, for example, is press-fit onto the inner sleeve 38. It can also be expedient to provide a configuration of the gripping section 37, for example, of plastic material, for actuation without a tool.

Figure 11:
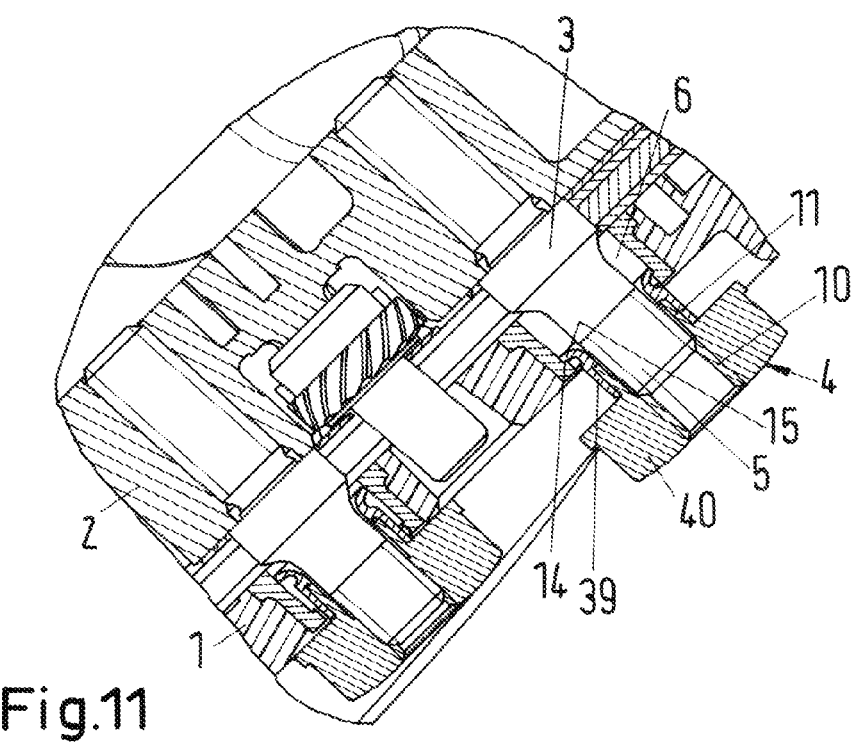
FIG. 11 shows a further embodiment of a two-part combination nut.

In the embodiment according to FIG. 11, a reverse configuration is selected in comparison to the arrangement of FIG. 10. The two-part nut 4 has a nut section 40 with the inner thread section 10 and at least one part of the sleeve section 11. The sleeve section 11 is surrounded on its exterior side by an external sleeve 39. Assembly is realized in a similar way as in the embodiment of FIG. 10, in that the outer sleeve 39 is guided from the interior side to the exterior side 12 and the nut section 40 is guided from the exterior side 12 into the opening 6. Subsequently, a connection of both parts is realized without this requiring a forming process.

Figure 12:
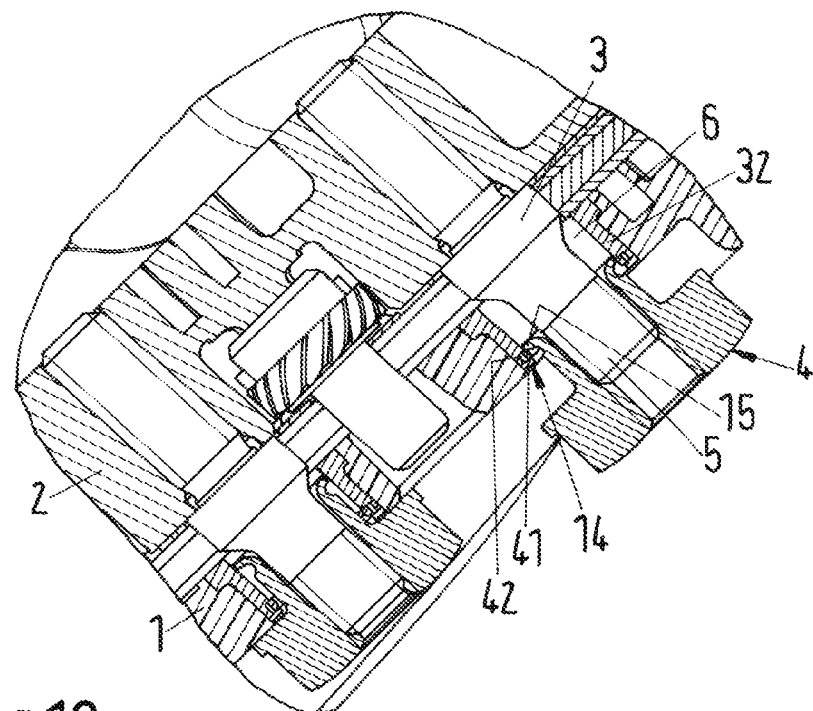
FIG. 12 is an embodiment of the invention with a spring ring inserted into the sprocket cover for fixation of the nut.

A further embodiment of the invention is shown in FIG. 12. The nut 4 is embodied as a monolithic part as in the embodiment of FIG. 6. The sleeve 32 inserted into the sprocket cover 1 supports on its inner side a circumferentially extending spring ring 41 that is secured in a circumferential groove 42 of the sleeve 32. The spring ring 41 forms the securing edge 14 for the nose 15 of the nut 4.

Figure 13:
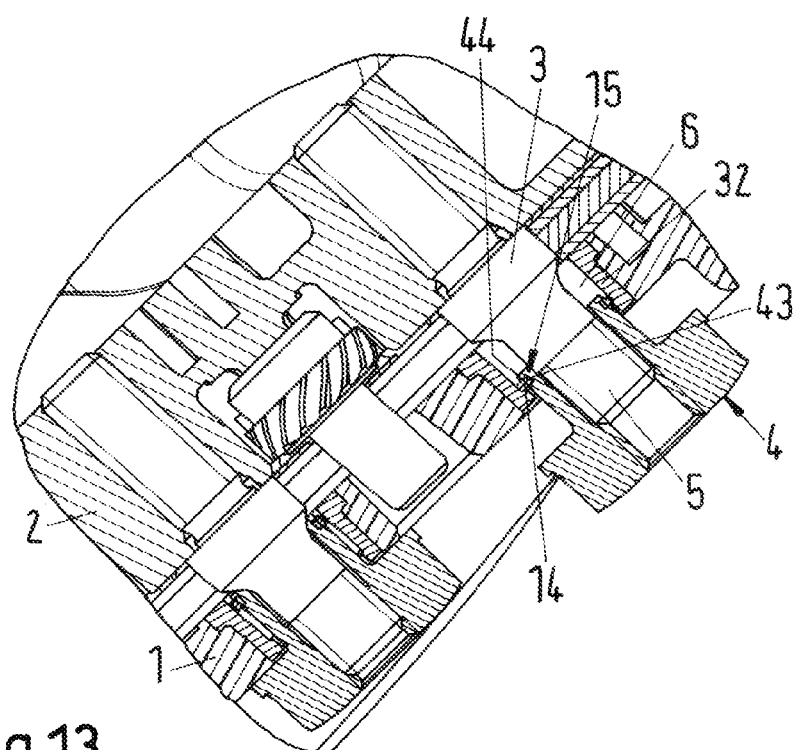
FIG. 13 is a variant of the arrangement according to FIG. 12 with a spring ring attached to the nut.

As an alternative to the arrangement of FIG. 12, an embodiment according to FIG. 13 can be expedient in which a groove 44 extends on the outer side about the tubular shaft 17 of the nut 4. A spring ring 43 is inserted into the groove 44 and forms the circumferentially extending nose 15 of the nut 4. In this connection, the sleeve 32 is configured in accordance with the embodiment of FIG. 7.

With regard to other features and reference numerals, the embodiments of FIGS. 7 to 13 are identical in comparison to one another and in comparison to the embodiment of FIG. 6. The various features of the individual embodiments can be combined with one another in any way.

The specification incorporates by reference the entire disclosure of German priority document 10 2006 037329.4 having a filing date of 10 Aug. 2006.

While specific embodiments of the invention have been shown and described in detail to illustrate the inventive principles, it will be understood that the invention may be embodied otherwise without departing from such principles.

What is claimed is:

1. A sprocket cover arrangement for a hand-held chain saw, the sprocket cover arrangement comprising:
   a sprocket cover having an opening;
   a housing;
   at least one stud bolt having a first end fixedly and non-rotatably attached to the housing and having a second end that is a free threaded end, wherein the free threaded end projects through the opening of the sprocket cover to an exterior side of the sprocket cover when the sprocket cover is positioned in an operating position on the housing;
   a nut to be screwed onto the free threaded end of the at least one stud bolt on the exterior side of the sprocket cover so as to secure the sprocket cover on the housing;
   wherein said nut has a tubular shaft and a radial outwardly oriented nose, wherein said tubular shaft of said nut is inserted into said opening of said sprocket cover and is arranged freely rotatable and with play in said opening of said sprocket cover;
   wherein said opening of said sprocket cover has a radial inwardly oriented securing edge and said nose of said nut engages positive-lockingly said securing edge such that said nut is secured captively, rotatably and with play in said opening of said sprocket cover.

2. The sprocket cover arrangement according to claim 1, wherein said play is axial play relative to a longitudinal axis of said at least one stud bolt.

3. The sprocket cover arrangement according to claim 2, wherein said axial play is at least as large as a screw-in depth of said at least one stud bolt into said nut.

4. The sprocket cover arrangement according to claim 1, wherein said play is radial play relative to a longitudinal axis of said at least one stud bolt.

5. The sprocket cover arrangement according to claim 1, wherein said play is tilting play relative to a longitudinal axis of said at least one stud bolt.

6. The sprocket cover arrangement according to claim 1, wherein said nut has a centering cone for said at least one stud bolt on an end of said nut facing said at least one stud bolt.

7. The sprocket cover arrangement according to claim 1, wherein said nut has an actuating section and said tubular shaft adjoins said actuating section.

8. The sprocket cover arrangement according to claim 7, wherein said actuating section is a hexagon section.

9. The sprocket cover arrangement according to claim 1, wherein said nut is a shoulder nut.

10. A sprocket cover arrangement for a hand-held chain saw, the sprocket cover arrangement comprising:
    a sprocket cover having an opening;
    a housing;
    at least one stud bolt having a first end secured to said housing and having a second end that is a free threaded end, wherein said free threaded end projects through said opening of said sprocket cover to an exterior side of said sprocket cover when said sprocket cover is positioned in an operating position on said housing;
    a nut to be screwed onto said free threaded end of said at least one stud bolt on said exterior side of said sprocket cover so as to secure said sprocket cover on said housing;
    wherein said nut is secured captively, rotatably and with play in said opening of said sprocket cover;

wherein said nut has an inner thread section and a smooth sleeve section adjoining said inner thread section on an end of said nut facing said at least one stud bolt;

wherein a length of said at least one stud bolt and a length of said smooth sleeve section are matched relative to one another such that said at least one stud bolt engages said at least one smooth sleeve section when said sprocket cover is in said operating position and said nut is completely pulled out toward said exterior side of said sprocket cover.

* * * * *